US009973729B2

(12) United States Patent
Morrison et al.

(10) Patent No.: US 9,973,729 B2
(45) Date of Patent: May 15, 2018

(54) DISPLAY AND SERVICE ADJUSTMENTS TO ENABLE MULTI-TASKING DURING A VIDEO CALL

(71) Applicant: T-Mobile USA, Inc., Bellevue, WA (US)

(72) Inventors: Andrew R. Morrison, Bellevue, WA (US); Christopher S. Park, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 189 days.

(21) Appl. No.: 13/732,170

(22) Filed: Dec. 31, 2012

(65) Prior Publication Data
US 2014/0184723 A1    Jul. 3, 2014

(51) Int. Cl.
H04N 7/14    (2006.01)
H04L 29/06    (2006.01)

(52) U.S. Cl.
CPC ........... *H04N 7/147* (2013.01); *H04L 65/602* (2013.01); *H04L 65/80* (2013.01)

(58) Field of Classification Search
CPC ....... H04N 7/15; H04N 21/4788; H04N 7/144
USPC ................... 348/14.01, 14.02, 14.03, 14.07
See application file for complete search history.

(56) References Cited

U.S. PATENT DOCUMENTS

| 6,246,407 | B1 | 6/2001 | Wilks et al. |
| 6,519,771 | B1 | 2/2003 | Zenith |
| 7,549,127 | B2* | 6/2009 | Chasen ................. G06F 9/4443 715/788 |
| 8,555,179 | B2* | 10/2013 | Lee et al. ........................ 715/758 |
| 8,576,178 | B2* | 11/2013 | Kim et al. ..................... 345/173 |
| 2004/0184523 | A1* | 9/2004 | Dawson ............. H04N 7/17318 375/240.1 |
| 2007/0174489 | A1* | 7/2007 | Iwabuchi ............ G06F 17/3028 709/246 |
| 2008/0003985 | A1* | 1/2008 | Jung et al. .................. 455/414.1 |
| 2010/0041457 | A1 | 2/2010 | Cook et al. |
| 2010/0138784 | A1 | 6/2010 | Colley |
| 2012/0102403 | A1 | 4/2012 | Pennington et al. |
| 2012/0206559 | A1* | 8/2012 | Lin ..................... H04L 12/1827 348/14.08 |
| 2012/0287224 | A1 | 11/2012 | Paris |
| 2014/0003450 | A1* | 1/2014 | Bentley .................... H04N 7/15 370/468 |

* cited by examiner

Primary Examiner — Amal Zenati
(74) Attorney, Agent, or Firm — Lee & Hayes, PLLC

(57) ABSTRACT

A telecommunication device configured to enable a user to engage in a telecommunication device activity while participating in a video call is described herein. The telecommunication device concurrently displays user interfaces for the video call and the activity. The user interfaces may be displayed adjacent to each other, or one may be presented as an overlay in front of the other. The telecommunication device also informs a video call service that the video call user interface is not displayed in full-screen and, as a result, receives video call data at a reduced frame rate or reduced quality-of-service.

15 Claims, 10 Drawing Sheets

DISPLAY VIDEO CALL UI AND ACTIVITY UI, VIDEO CALL UI RESIZED 108

DISPLAY VIDEO CALL UI, RECEIVE INPUT INIT. ACTIVITY 106

DISPLAY VIDEO CALL UI AND ACTIVITY UI, VIDEO CALL UI AS OVERLAY 112

DISPLAY AND SERVICE ADJUSTMENTS TO ENABLE MULTI-TASKING DURING A VIDEO CALL

BACKGROUND

Telecommunication devices have evolved from mobile replacements for the telephone to all-in-one communication, media, and productivity solutions. In addition to voice calling, telecommunication devices now support video and song playback, calendaring, and a variety of features requiring communication of very large amounts of data over telecommunication and data networks. One such feature is video calling. The data associated with a video call is significantly larger than data associated with a voice call. The increasing popularity of video calling, then, results in a far greater demand being placed on network and telecommunication device resources. Network operators have recognized this increased demand by either increasing the cost of unlimited data plans or by eliminating such plans altogether. Consequently, a telecommunication device user that engages in frequent video calls may find himself or herself with very expensive service charges.

Typically, video calls are also delivered with high frame rates and high quality-of-service (QoS) to ensure positive user experiences. These high frame rates and high QoS assume that the video part of the video call will be displayed in full screen mode, as video calls are delivered in full screen mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
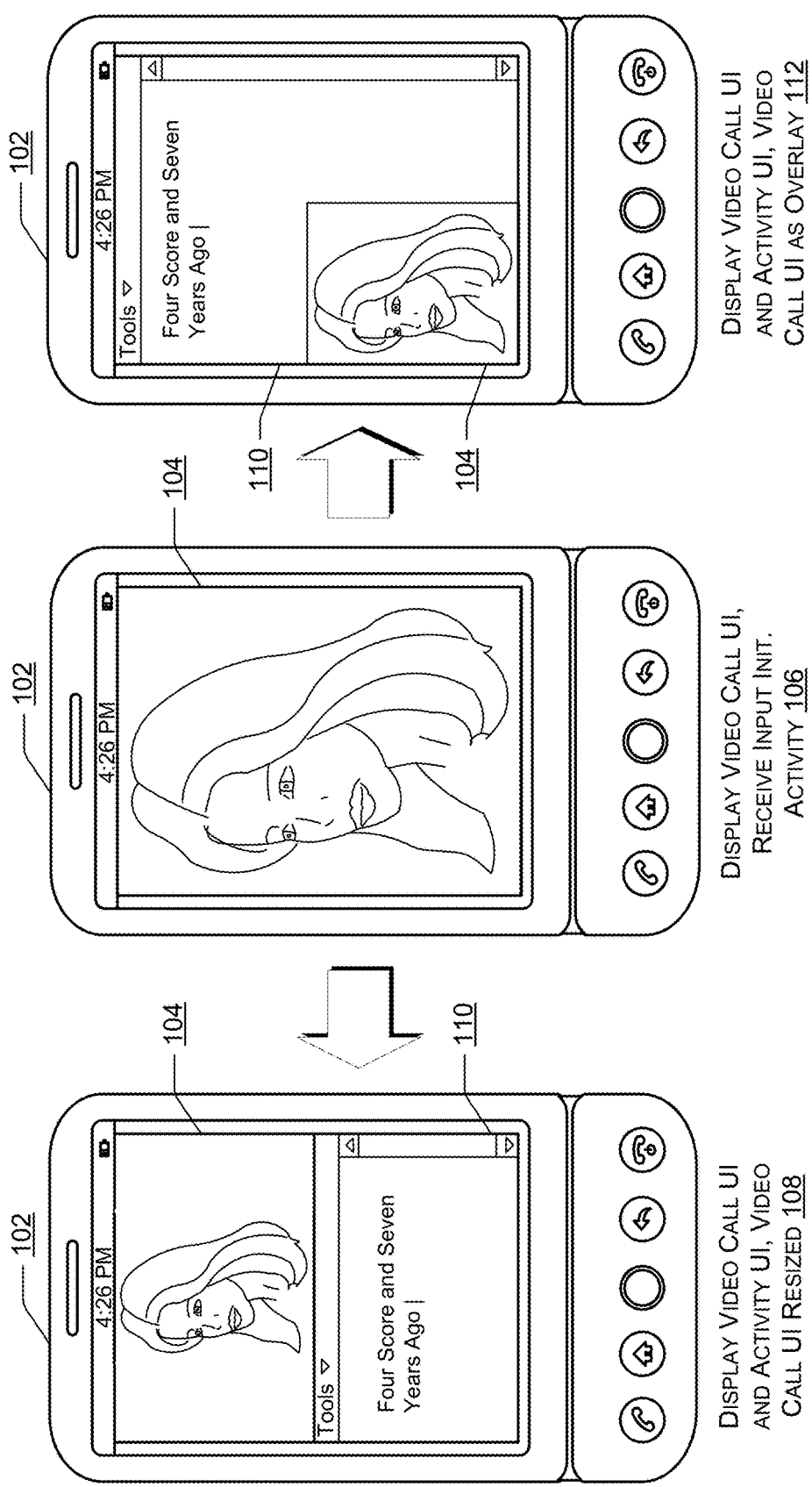
FIG. 1 illustrates example display adjustments made when a telecommunication device activity is initiated during a video call.

This disclosure describes, in part, a telecommunication device that allows a user to multi-task during a video call by concurrently displaying a video call user interface and an activity user interface. Many telecommunication device activities, including those unrelated to video calls, consume significant device and network resources. When added to the significant resources consumed by video calling, this may make multi-tasking seem costly and, perhaps, undesirable. The telecommunication device described herein, however, may reduce the consumption of network resources associated with the video call by causing a video call service to reduce a frame rate or QoS for a video call when the user of the telecommunication device is engaged in multi-tasking. Because the video call user interface displayed during multi-tasking has a reduced display size, the reduced frame rate or QoS does not negatively affect user experience. Thus, by reducing the display size for the video call user interface during multi-tasking and causing the video call service to use a reduced frame rate or QoS in delivering the video call, the telecommunication device provides its user with video calling and multi-tasking capabilities that do not require prohibitively costly resource consumption.

In various embodiments, the telecommunication device may initiate video call multi-tasking from either a video call or a telecommunication device activity. In the former case, the telecommunication device may be engaged in a video call and, while engaged in that call, receive input initiating a telecommunication device activity. The activity is a different activity from video calling, such as email texting, web browsing, gaming, media consumption (e.g., streaming or playback), or any other sort of activity. In the latter case, the telecommunication device may be enabling the user to engage in the telecommunication device activity and, while enabling the activity, may initiate a video call (e.g., responsive to an incoming video call).

Upon initiating video call multi-tasking, the telecommunication device concurrently displays user interfaces for the video call and the activity. The concurrent display may involve reducing a display size of a video call user interface or providing a new video call user interface with a display size that is less than the total display size of the telecommunication device's display screen. The user interfaces of the video call and activity may be display adjacent to each other or with one as an overlay in front of a portion of the other. During the video call, the user may begin or continue providing input associated with the telecommunication device activity.

Upon reducing the display size of the video call user interface (or upon providing the new video call user interface with the reduced display size), the telecommunication device notifies a video call service of the reduced display size. In response, the telecommunication device begins to receive the transmission of the video call at a reduced frame rate or QoS, conserving network resources.

In some embodiments, reduction of the display size for the video call user interface may be initiated by the video call service responsive to detecting a service condition (e.g., network congestion). Upon detecting the service condition, the video call service may reduce the frame rate or QoS for transmission of a video call and instruct the recipient of the transmission to reduce the display size.

Example Display Adjustment

FIG. 1 illustrates example display adjustments made when a telecommunication device activity is initiated during a video call. As illustrated, a telecommunication device 102 may display a video call user interface (video call UI) 104 in full screen mode, with the display size of the video call UI 104 being substantially the same as the display size of the display screen of the telecommunication device 102. While displaying the video call UI 104 in full screen mode, the telecommunication device 102 may receive 106 input initiating a telecommunication device activity that is different from the video call. Responsive to the input, the telecommunication device 102 may display 108 the video call UI 104 at a reduced display size and concurrently display 108 a telecommunication device activity user interface (activity UI) 110, the video call UI 104 and activity UI 110 display 108 adjacent to each other. Alternatively, the telecommunication device 102 may display 112 the video call UI 104 as a reduced-display-size overlay in front of a portion of the activity UI 110.

Figure 5:
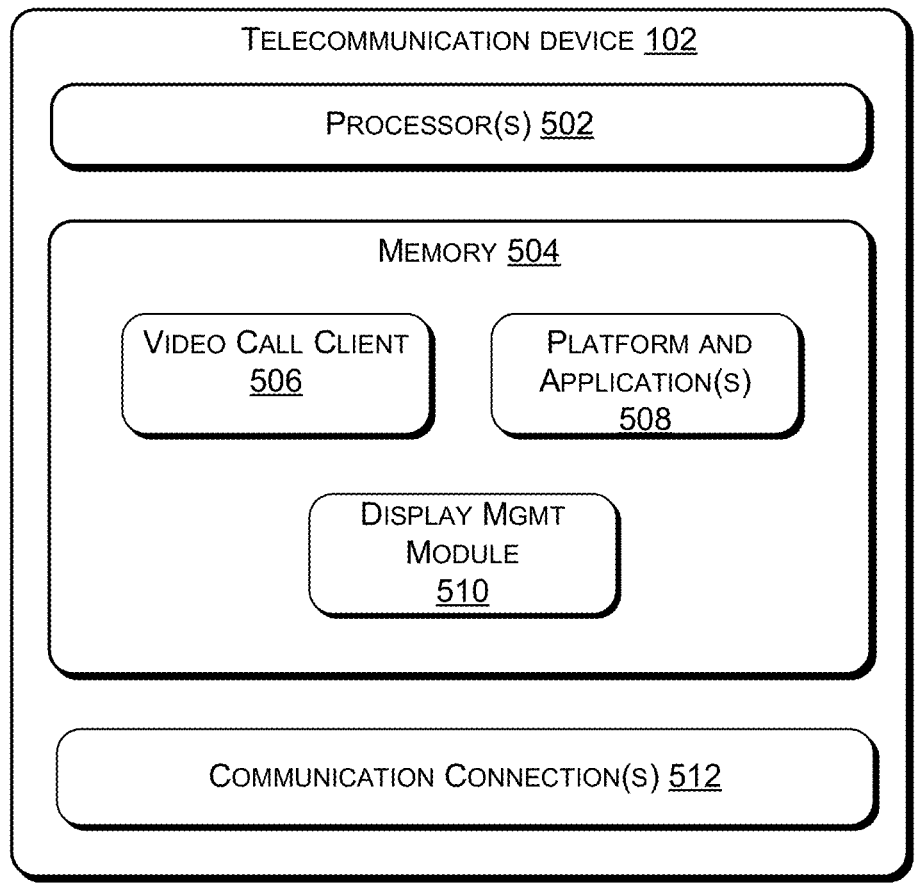
FIG. 5 illustrates an example telecommunication device configured to enable a user to engage in a telecommunication device activity while participating in a video call.

In various embodiments, the telecommunications device 102 may be any sort of device capable of engaging in a video call and of offering other telecommunication device activities. For example the telecommunication device 102 may be any of a smart phone, a tablet computer, a personal digital assistant (PDA), a personal computer (PC), a laptop computer, a media center, a work station, etc. An example telecommunications device 102, including a video call client for video calling and a platform and applications associated with telecommunication device activities, is illustrated in FIG. 5 and described below with reference to that figure.

As shown in FIG. 1, a user of a telecommunication device 102 may be engaged in a video call, and a video call UI 104 for that video call may be displayed using substantially the full display screen of the telecommunication device 102. Such a use of a substantial portion of the display screen by a single user interface may be referred to as displaying in a full screen mode. The video call UI 104 may be a streaming video of a conversation partner, of the user of the telecommunication device 102, of both the user and the conversation partner, or of some other content.

While displaying the video call UI 104, the telecommunication device 102 receives 106 input initiating a telecommunication device activity. The input may be input from the user of the telecommunication device 102, such as a press of a home screen key, or some soft key or physical key or button. Alternatively, the input may be from a remote service, a network operator, or from the telecommunication device activity itself. For example, a calendar application may be configured to surface alerts in advance of meeting times.

In response to receiving the input, the telecommunication device 102 may either display 108 an activity UI 110 adjacent to a reduced-size video call UI 104 or display 112 a reduced-size video call UI 104 as an overlay to the activity UI 110. Also, the telecommunication device 102 could display the activity UI 110 as an overlay to the video call UI 104. The telecommunication device 102 may select among these display arrangements based on user preferences or default, suggested, or required settings. In some embodiments, different telecommunication device activities may be displayed in different arrangements, some displayed adjacent and some with one user interface 104/110 or the other as an overlay. This may also be the result of user preferences or default, suggested, or required application settings.

In various embodiments, displaying 108 the video call UI 104 and activity UI 110 adjacent to each other may involve reducing a display size of the video call UI 104. Such a reduction in display size may be performed automatically and may reduce the display size to resultant display size specified by user preferences or other settings. In some embodiments, the magnitude of the reduction may be based on display size preferences or settings for the telecommunication device activity. The reduction of the display size of the video call UI 104 is performed simultaneously with the addition of the activity UI 110 to the display, resulting in concurrent, adjacent display 108 of the video call UI 104 and activity UI 110. As shown in FIG. 1, the activity UI 110 may be associated with any sort of telecommunication device activity that is different from a video call, such as writing in a word processing application.

Displaying 112 the video call UI 104 as an overlay to a portion of the activity UI 110 may involve reducing a display size of the video call UI 104. Such a reduction in display size may be performed automatically and may reduce the display size to resultant display size specified by user preferences or other settings. In some embodiments, the magnitude of the reduction may be based on display size preferences or settings for the telecommunication device activity. The reduction of the display size of the video call UI 104 is performed simultaneously with the addition of the activity UI 110 to the display, resulting in concurrent display 112 of the video call UI 104 and activity UI 110, with the video call UI 104 as an overlay.

While either concurrently displaying 108 adjacent user interfaces 104 and 110 or concurrently displaying 112 one user interface 104/110 in front of the other, the telecommunication device 102 may receive both continued video and audio to be transmitted as part of the video call and other user input related to the telecommunication device activity. For example, a user may continue to look into a telecommunication device camera and talk to a friend while entering text into a word processing application.

Figure 2:
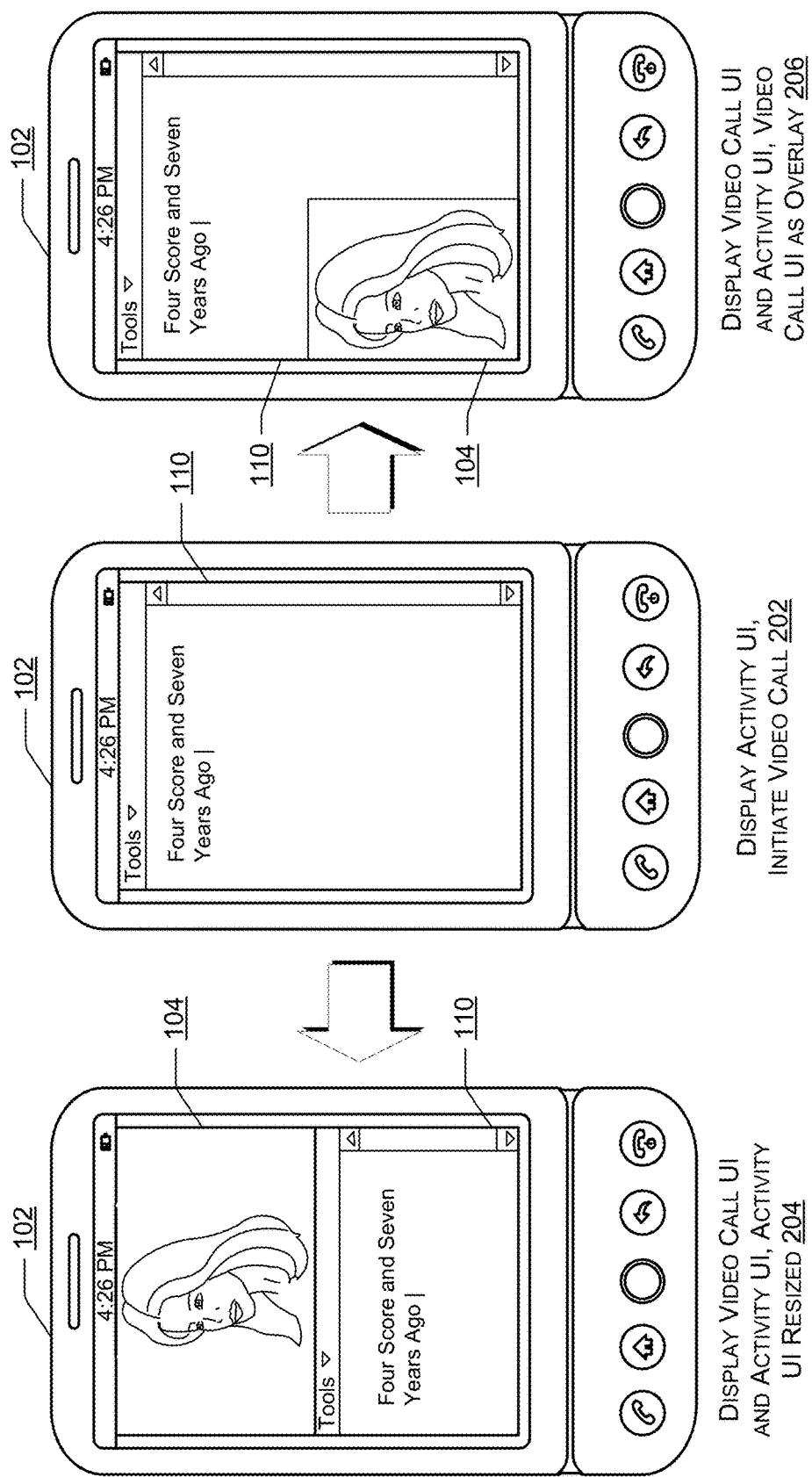
FIG. 2 illustrates example display adjustments made when a video call is initiated while a user engages in a telecommunication device activity.

FIG. 2 illustrates example display adjustments made when a video call is initiated while a user engages in a telecommunication device activity. As illustrated, a telecommunication device 102 may display an activity UI 110 in full screen mode, with the display size of the activity UI 110 being substantially the same as the display size of the display screen of the telecommunication device 102. While displaying the activity UI 110 in full screen mode, the telecommunication device 102 may initiate 202 a video call that is different from the telecommunication device activity. Responsive to the input, the telecommunication device 102 may display 204 a video call UI 104 with a display size less than that of the full display screen and concurrently display 204 the activity UI 110 with a reduced display size, the video call UI 104 and activity UI 110 displayed 204 adjacent to each other. Alternatively, the telecommunication device 102 may display 206 the video call UI 104 as a reduced-display-size overlay in front of a portion of the activity UI 110.

As shown in FIG. 2, a user of a telecommunication device 102 may be engaged in a telecommunication device activity that is separate and distinct from a video call, and an activity UI 110 for that telecommunication device activity may be displayed using substantially the full display screen of the telecommunication device 102. The activity UI 110 may be any sort of graphic display associated with a telecommunication device activity. For example, if the telecommunication device activity is text entry in a word processing application, the activity 110 may display a document view, various settings or controls of the word processing application, text already entered by a user, and a cursor indicating where further text will be entered.

While displaying the activity UI 110, the telecommunication device 102 initiates 202 a video call. The telecommunication device 102 may initiate 202 the video call by answering an incoming video call or may initiate such a video call responsive to input from a user of the telecommunication device 102, from a remote service, such as a video call service, or from a network operator. The telecommunication device 102 may answer an incoming video call automatically or responsive to a user electing to answer the video call. User input may be a press of a home screen key, or some soft key or physical key or button.

In response to initiating the video call, the telecommunication device 102 may either display 204 a reduced-size activity UI 110 adjacent to a video call UI 104 or display 206 a video call UI 104 as an overlay to the activity UI 110. Also, the telecommunication device 102 could display the activity UI 110 as an overlay to the video call UI 104. The telecommunication device 102 may select among these display arrangements based on user preferences or default, suggested, or required settings. In some embodiments, different telecommunication device activities may be displayed in different arrangements, some displayed adjacent and some with one user interface 104/110 or the other as an overlay. This may also be the result of user preferences or default, suggested, or required application settings.

In various embodiments, displaying 204 the video call UI 104 and activity UI 110 adjacent to each other involves displaying video call UI 104 with a display size that is reduced from a display size typically used in full screen mode. For example, as shown in FIG. 2, the video call UI 104 may be displayed with a display size that is approximately half the display size of the display screen of the telecommunication device 102. Such display at a smaller size may be performed automatically and may set the display size to resultant display size specified by user preferences or other settings. In some embodiments, the relative display sizes of the video call UI 104 and activity UI 110 may be based on preferences or settings for the telecommunication device activity. The reduction of the display size of the activity UI 110 is performed simultaneously with the addition of the video call UI 104 to the display, resulting in concurrent, adjacent display 204 of the video call UI 104 and activity UI 110.

Displaying 206 the video call UI 104 as an overlay to a portion of the activity UI 110 involves displaying video call UI 104 with a display size that is reduced from a display size typically used in full screen mode. Such display at a smaller size may be performed automatically and may set the display size to resultant display size specified by user preferences or other settings. In some embodiments, the relative display sizes of the video call UI 104 and activity UI 110 may be based on preferences or settings for the telecommunication device activity. The reduction of the display size of the activity UI 110 is performed simultaneously with the addition of the video call UI 104 to the display, resulting in concurrent display 206 of the video call UI 104 and activity UI 110, with the video call UI 104 as an overlay.

While either concurrently displaying 204 adjacent user interfaces 104 and 110 or concurrently displaying 206 one user interface 104/110 in front of the other, the telecommunication device 102 may receive both continued video and audio to be transmitted as part of the video call and other user input related to the telecommunication device activity. For example, a user may continue to look into a telecommunication device camera and talk to a friend while entering text into a word processing application.

Example Video Call Transmission Adjustments

Figure 3:
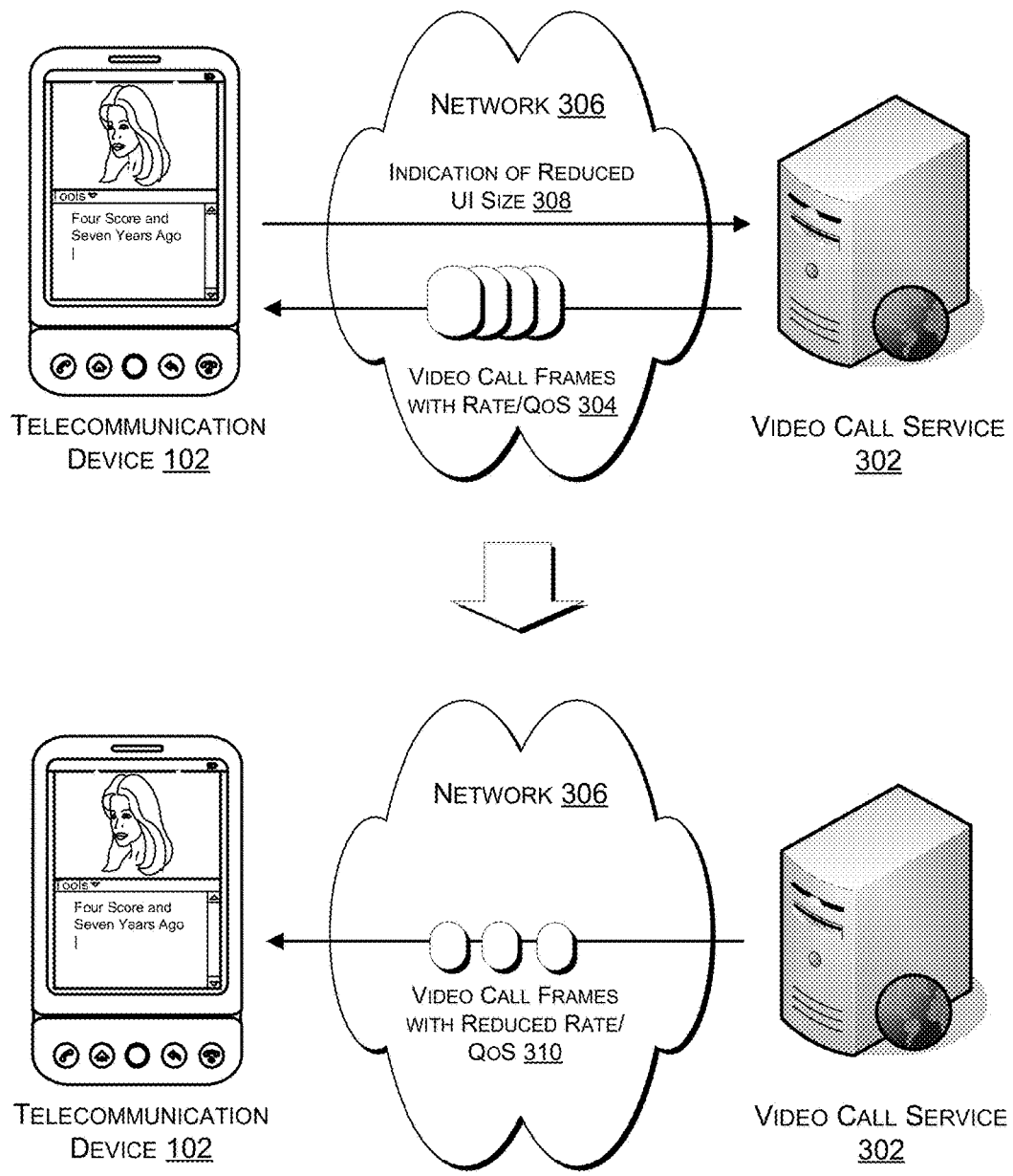
FIG. 3 illustrates a video call service and telecommunication device communicating over a network, with the video call service reducing a frame rate or QoS for the transmission of video call data to the telecommunication device.

FIG. 3 illustrates a video call service and telecommunication device communicating over a network, with the video call service reducing a frame rate or QoS for the transmission of video call data to the telecommunication device. As illustrated, a telecommunication device 102 communicates with a video call service 302, receiving video call data 304 transmitted with a specific frame rate and QoS. The telecommunication device 102 receives the video call data 304 over a network 306 that connects the telecommunication device 102 and the video call service 302. At some point in time, the telecommunication device 102 may reduce a display size of a video call UI associated with the video call data 304 and may send a notification 308 of the display size reduction to the video call service 302. Responsive to the notification 308, the video call service 302 reduces the specific frame rate or QoS for the video call and transmits video call data 310 at the reduced frame rate or QoS to the telecommunication device 102.

Figure 6:
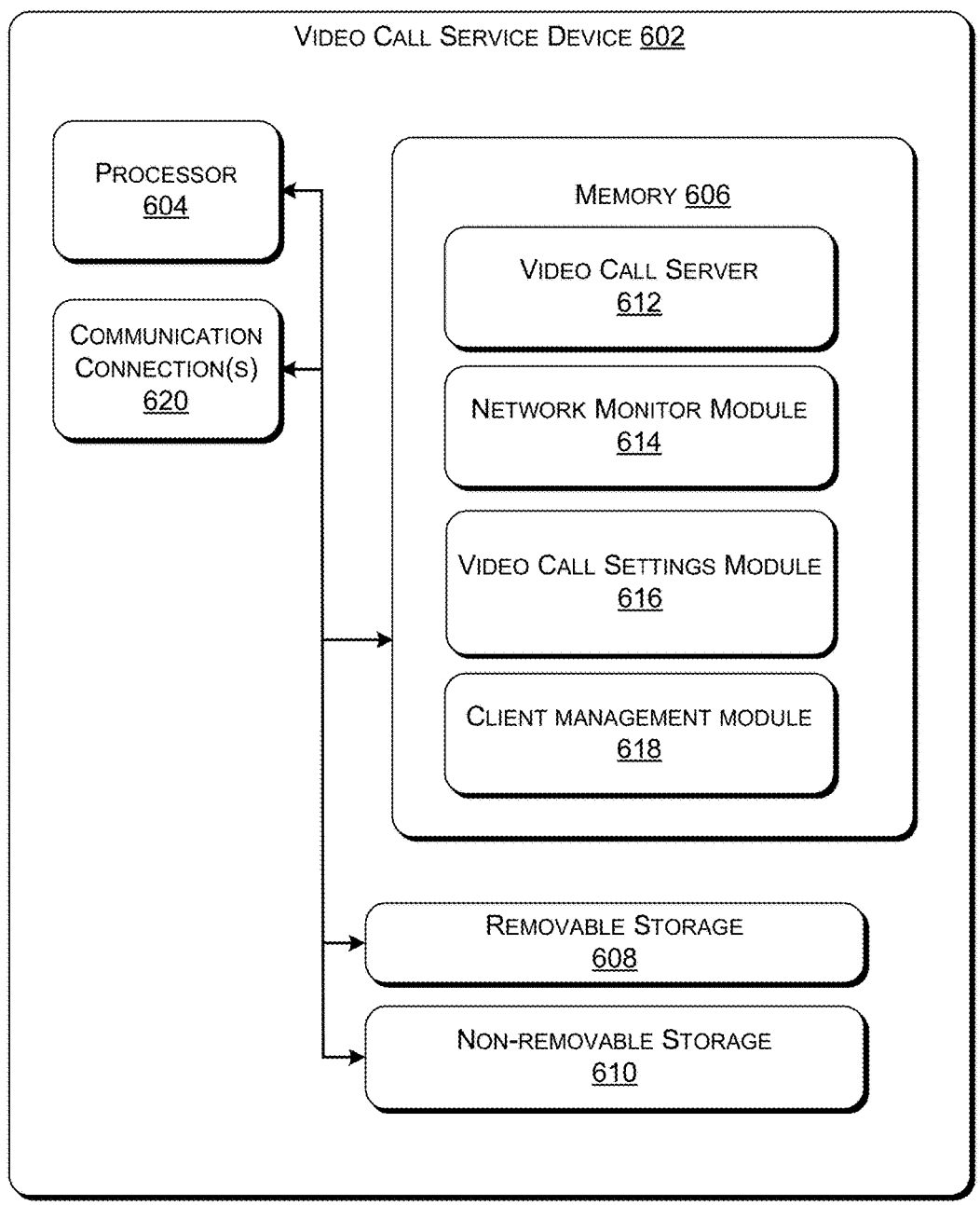
FIG. 6 illustrates an example video call service device configured to reduce a frame rate or QoS responsive to receiving an indication from a telecommunication device that a video call user interface is displayed at a reduced display size.

In various embodiments, the video call service 302 may include any one or more computing devices acting alone or as a service cloud connected by a local or private network. For example a video call service device may be any of a tablet computer, a personal computer (PC), a laptop computer, a media center, a work station, a server device, a mainframe computer, etc. An example video call service device is illustrated in FIG. 6 and described below with reference to that figure.

The video call data 304 may comprise frames of video and an audio stream, which may be provided in separate delivery channels or in a same channel. The video call data 304 may be organized into network packets, such as Internet Protocol (IP) packets or may be provided as a bit stream to be delivered in a circuit-switched manner. The packets or bit stream may vary in quantity or size based on the frame rate. The higher the frame rate, the more video call data 304 is transmitted. The QoS indicates the priority and transmission quality a network operator of the network 306 is to provide. Packets of the video call data 304 may be marked with the specific QoS.

In some embodiments, the network 306 is a packet-based network, such as a WiFi network, an LTE network, an HSPA+ network, a Bluetooth network, or a network associated with infrared technology. The network 306 may also be or include a circuit-switched network, such as a 2G or 3G network. Further, the network 306 may be or include a cellular network operated by a network operator. The network 306 may include a base station transceiver, base station controller, a node B, or an eNode B. Also, such a network 306 may include one or more access networks and a core network. The video call service 302 may be part of the core network or may be independent of the network operator, connected to the network 306 through an access network.

In various embodiments, the telecommunication device 102 may provide a notification 308 when the video call associated with the video call data 304 is not displayed in full screen mode. This may result from a reduction of the display size, as illustrated in FIG. 1, or from initially providing the video call UI 104 for the video call at a display size that is less than full screen mode, as shown in FIG. 2. The notification 308 may simply indicate that the display size is reduced, or may specify the reduced display size used to display the video call UI 104.

Upon receiving a notification 308, the video call service 302 may reduce the frame rate or QoS associated with the video call. The reduction may be to some specific or default level, or may vary based on a specified display size included in the notification 308. If the latter, the video call service 302 may have rules or a model that associates specific display sizes with specific frame rates or QoSes. To achieve the reduced frame rate, the video call service 302 may alter a video call service setting for the frame rate which may either cause frames received from a communication partner for the telecommunication device 102 to be dropped or which may cause the video call service 302 to instruct the communication partner to reduce the frame rate it is using for the video call. To achieve a reduced QoS, the video call service may mark packets transmitting the video call data 310 with the reduced QoS or may request that the network operator associated with network 306 utilize a lower QoS when transmitting the video call data 310. In some embodiments, the reduction of the frame rate or QoS may be performed conditionally based on a service plan offered by the video call service 302 or network operator of the network 306.

In some embodiments, the video call service 302 then transmits the video call data 310 at the reduced frame rate or QoS. At some later point in time, if the video call UI 104 is returned or set to full screen mode, a further notification may be sent from the telecommunication device 102 to the video call service 302. The video call service 302 may then return the frame rate or QoS to the specific frame rate or QoS and continue transmitting the video call as video call data 304.

Figure 4:
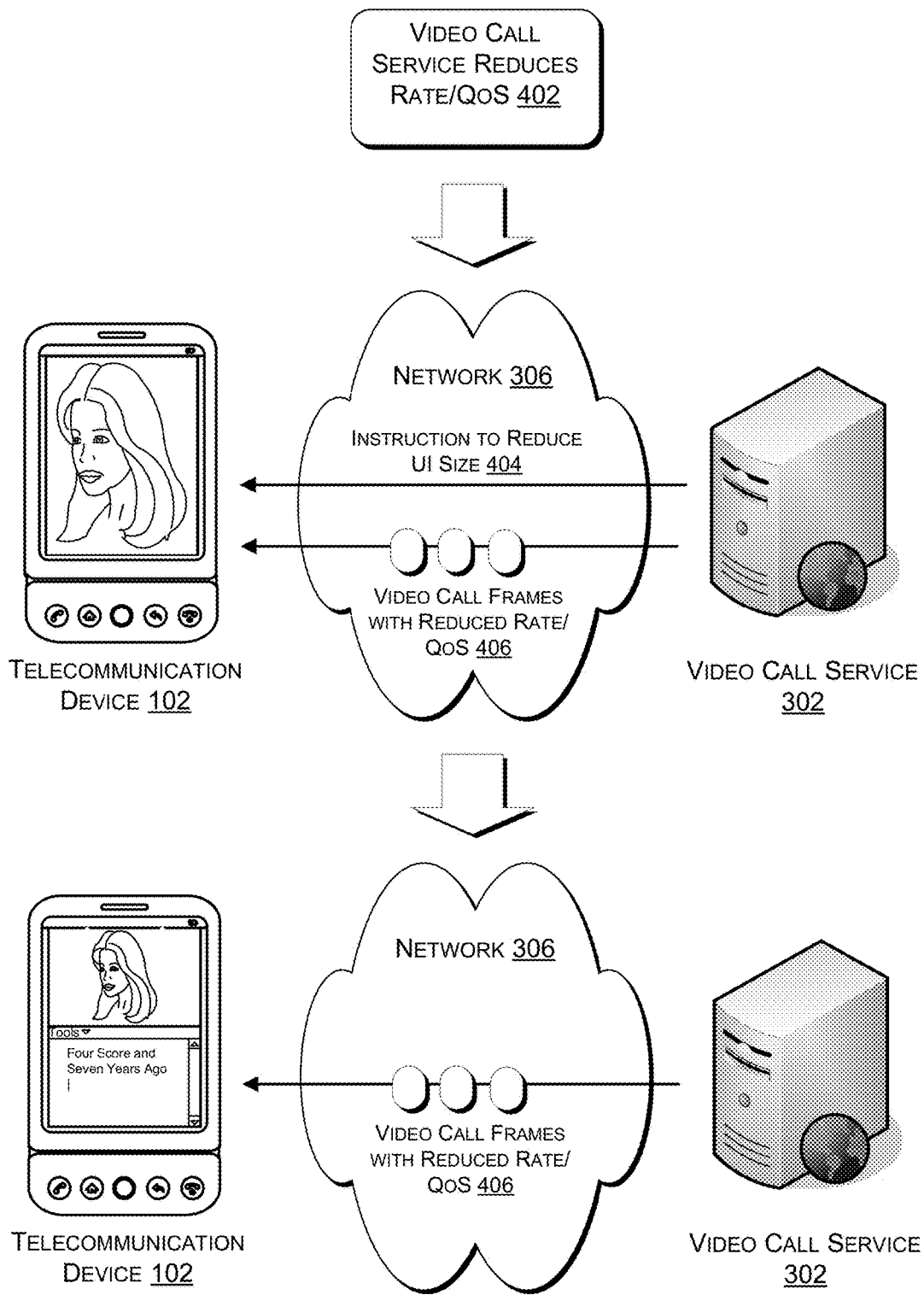
FIG. 4 illustrates a video call service reducing a frame rate or QoS for a video call and instructing a telecommunication device engaged in the video call to reduce a display size of its video call user interface.

FIG. 4 illustrates a video call service reducing a frame rate or QoS for a video call and instructing a telecommunication device engaged in the video call to reduce a display size of its video call user interface. As illustrated, at 402, a video call service 302 may reduce a frame rate or QoS for a video call. Such a reduction may be responsive to detecting a service condition. The video call service 302 may then transmit instructions 404 to the telecommunication device 102, instructing the telecommunication device 102 to reduce a display size used for a video call UI 104 of the video call. Also, the video call service 302 may transmit the video call data 406 at the reduced frame rate or QoS. The telecommunication device 102 may then display the video call UI 104 at the reduced display size while it receives the video call data 406 with the reduced frame rate or QoS.

In various embodiments, the video call service 302 may reduce, at 402, the frame rate or QoS of a video call responsive to any sort of service condition. For example, the downlink channel to the telecommunication device 102 (downlink referring to transmission of data from network 306 to the telecommunication device 102) may be congested or otherwise available at reduced signal strength. Upon detecting or being notified of such a condition, the video call service 302 may reduced the frame rate or QoS to continue delivering the video call while improving the service conditions. The video call service 302 may reduce the frame rate or QoS in the manner described above.

The instructions 404 may simply indicate that the video call UI display size should be reduced or may specify the reduced display size that the telecommunication device 102 should use. Upon receiving the instruction 404 and the video call data 406 at the reduced frame rate or QoS, the telecommunication device 102 may display the video call UI 104 at the reduced size and may also, optionally, initiate or enable multi-tasking by initiating, or allowing a user to initiate, a telecommunication device activity.

Example Devices

FIG. 5 illustrates an example telecommunication device configured to enable a user to engage in a telecommunication device activity while participating in a video call. As illustrated, telecommunication device 102 comprises processor(s) 502 and memory 504 storing a video call client 506, platform and application(s) 508, and display management module 510. Also, the telecommunication device 102 includes communication connection(s) 512.

In some embodiments, the processor(s) 502 is a central processing unit (CPU), a graphics processing unit (GPU), or both CPU and GPU, or other processing unit or component known in the art.

In various embodiments, memory 502 is volatile (such as RAM), non-volatile (such as ROM, flash memory, etc.) or some combination of the two. The video call client 506, platform and application(s) 508, and display management module 510 may comprise methods, threads, processes, applications or any other sort of executable instructions. The video call client 506, platform and application(s) 508, and display management module 510 may also include files and databases.

In various embodiments, the video call client 506 may be any sort of video call client capable of receiving and rendering video and audio streams and, if needed, synchronizing those streams. The video call client 506 may also retrieve a video feed from a camera of the telecommunication device 102 and an audio feed from a speaker of the telecommunication device 102 and may transmit the retrieved video and audio to a video call service 302 for relay to a conversation partner. The video call client 506 may also include one or more settings, such as a minimum display size. Additionally, the video call client 506 may be configured to determine when the video call UI 104 associated with a video call is not displayed in full screen mode and, in response, to notify a video call service 302 of the reduced display size. In further embodiments, the video call client 506 may also receive instructions 404 from the video call service 302 to reduce the display size of the video call UI 104 and request that the display management module 110 render the video call UI 104 at the reduced display size.

In some embodiments, the platform and application(s) 508 may include an operating system, applications installed with the operating system, and third party applications installed by a user or service. These platform and application (s) 508 may offer the telecommunication device activities that are different from the video call. The telecommunication device activities may include email, texting, web browsing, gaming, media consumption (e.g., streaming or playback), productivity tools (e.g., word processing), or any other sort of activity. In some embodiments, each platform/application 508 may be associated with one or more settings, such as a minimum display size or a reduced display size to use in a multi-tasking mode.

In various embodiments, the display management module 510 may receive user interface data from the video call client 506 and/or from the platform and application(s) 508. If receiving user interface data from only one of the video call client 506 or the platform and application(s) 508, the display management module 510 may render that user interface data to the display in a full screen mode. If receiving user interface data from both the video call client 506 and the platform and application(s) 508, the display management module 510 may determine what portion of the display to allocate to each of the video call client 506 and the platform and application(s) 508. The display management module 510 may make the determination based on minimum display size settings, based on reduced display size settings for the platform or application(s) 508, or based on other user preferences or settings. Such other preferences or settings could include preferences or settings for rendering the user interfaces adjacent to each other or for rendering one as an overlay in front of a portion of the other. Upon making the determination, the display management module 510 may render the user interface data for the video call client 506 and the platform and application(s) 508 in the manner determined. In addition to determining and rendering, the display management module 510 may receive user input to resize one of the video call UI 104 or activity UI 110 and may adjust the portions of the display allocated to each of the video call client 506 and the platform and application(s) 508. Such adjustments and resizing may not reduce a display size for user interface data from the video call client 506 or the platform and application(s) 508 below a minimum display size setting.

In some embodiments, the display management module 510 may also receive touch input and may associate the touch input with either the video call client 506 or with the platform and application(s) 508 based on what part of the display is touched (i.e., based on whether the part associated with the video call client 506 is touched or whether the part associated with the platform and application(s) 508 is touched. In other embodiments, input may be associated with either the video call client 506 or with the platform and application(s) 508 based on the source of the input (e.g., camera, speaker, display, keypad). For instance, input received from the camera and speaker may be transmitted to the video call client 104, and input received from the display or keypad may be sent to the platform and application(s) 508.

Memory 504 may include tangible computer-readable media. Such tangible computer-readable media may include volatile and nonvolatile, removable and non-removable memory devices. Tangible computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, etc.

Telecommunication device 102 also has input device(s), such as a keypad, a cursor control, a touch-sensitive display, voice input device, etc., and output device(s) such as a display, speakers, etc. These devices are well known in the art and need not be discussed at length here.

As illustrated in FIG. 5, the telecommunication device 102 also includes one or more communication connections 512 to enable communication with other local or remote devices, such as the device(s) of the video call service. These communication connections 512 may represent wireless transceivers capable of sending and receiving wireless, radio frequency (RF) and WiFi communications.

FIG. 6 illustrates an example video call service device configured to reduce a frame rate or QoS responsive to receiving an indication from a telecommunication device that a video call user interface is displayed at a reduced display size. As illustrated, a video call service device 602 comprises processor(s) 604, memory 606, a removable storage 608 and non-removable storage 610. The memory 606 may store a video call server 612, a network monitor module 614, a video call settings module 616, and a client management module 618. Also, the video call service device 602 includes communication connections 620 to enable communications with other local and remote devices.

In some embodiments, the processor(s) 604 is a central processing unit (CPU), a graphics processing unit (GPU), or both CPU and GPU, or other processing unit or component known in the art.

In various embodiments, memory 606 is volatile (such as RAM), non-volatile (such as ROM, flash memory, etc.) or some combination of the two. The video call server 612, a network monitor module 614, a video call settings module 616, and a client management module 618 may comprise methods, threads, processes, applications or any other sort of executable instructions. The video call server 612, a network monitor module 614, a video call settings module 616, and a client management module 618 may also include files and databases.

In some embodiments, the video call server 612 may connect video calls between telecommunication devices 102 and exchange video and audio streams between the telecommunication devices 102. The video call server 612 may also set and coordinate frame rates and QoSes used by the telecommunication devices 102. The video call server 612 may also receive notifications 308 from telecommunication devices 102 of reduced display sizes and may invoke the video call settings module 616 to reduce the frame rate or QoS used for the video call.

In various embodiments, the network monitor module 614 may detect various service or network conditions, such as congestion or impaired signal strength, associated with a specific video call connection between the video call service 302 and a telecommunication device 102. Responsive to detecting such conditions, the network monitor module 614 invokes the video call settings module 616 to reduce the frame rate or QoS for a video call and invokes the client management module 618 to instruct the video call client 504 to reduce the display size.

In some embodiments, the video call settings module 616 is invoked by the video call server 612 or network monitor module 614 to reduce a frame rate or QoS for a video call. The video call settings module 616 affects the reduction in the manner described above.

In various embodiments, the client management module 618, when invoked, instructs a video call client 506 to reduce a display size used for a video call UI 104.

The video call service device 602 also includes additional data storage devices (removable and/or non-removable) such as, for example, magnetic disks, optical disks, or tape. Such additional storage is illustrated in FIG. 6 by removable storage 608 and non-removable storage 610. Tangible computer-readable media may include volatile and nonvolatile, removable and non-removable memory devices. Memory 606, removable storage 608 and non-removable storage 610 are all examples of tangible computer-readable media. Tangible computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, etc. Any such tangible computer-readable media may be part of the video call service device 602.

Video call service device 602 also has input device(s), such as a keypad, a cursor control, a touch-sensitive display, voice input device, etc., and output device(s) such as a display, speakers, etc. These devices are well known in the art and need not be discussed at length here.

As illustrated in FIG. 6, the video call service device 602 also includes one or more communication connections 620 to enable communication with other local or remote devices, such as the telecommunication device 102. These communication connections 620 may represent wireless transceivers capable of sending and receiving wireless, radio frequency (RF) and WiFi communications. They may also represent wired modems, such as Ethernet connectors.

Example Processes

FIGS. 7-10 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 7:
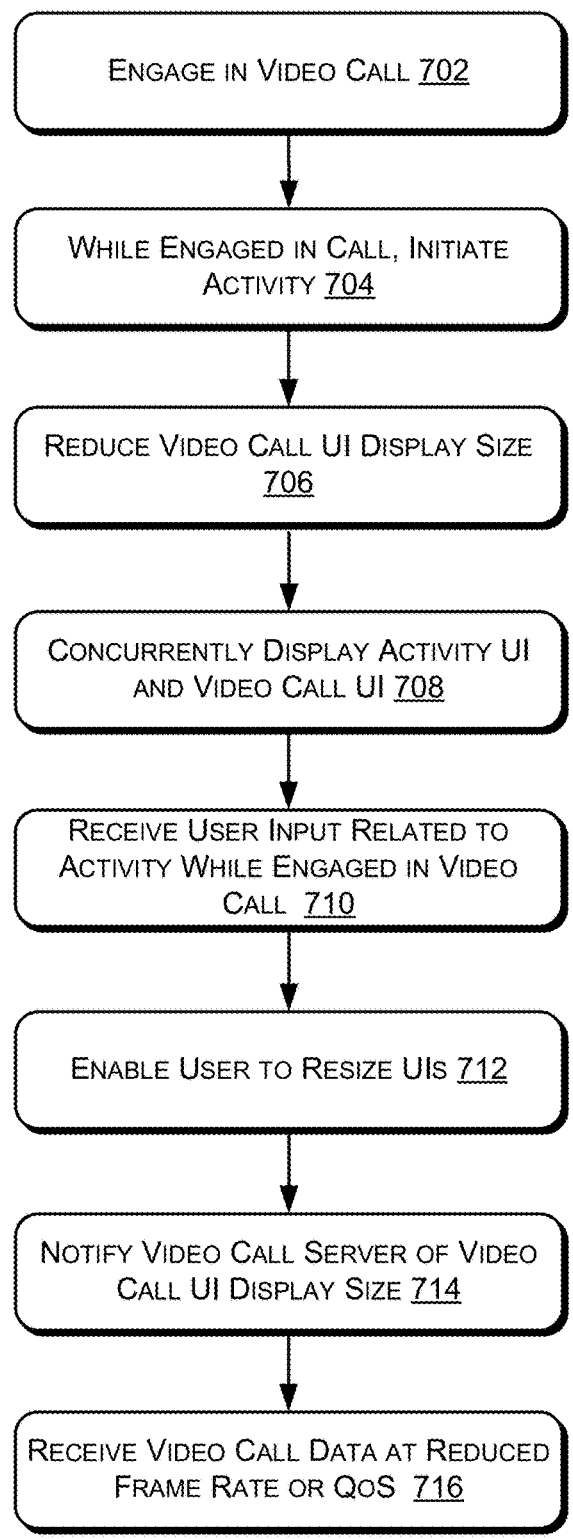
FIG. 7 illustrates an example process for initiating an activity during a video call, concurrently displaying user interfaces for the video call and the activity, and receiving user input for the activity during the video call.

FIG. 7 illustrates an example process for initiating an activity during a video call, concurrently displaying user interfaces for the video call and the activity, and receiving user input for the activity during the video call. The process includes, at 702, engaging, by a telecommunication device, in a video call with another telecommunication device. The video call may be facilitated by a video call service.

At 704, while engaged in the video call, the telecommunication device may receive input initiating a telecommunication device activity that is different from the video call. The telecommunication device activity may be unrelated to the video call. The input may be user input or a prompt from a telecommunication device application or from a remote service.

At 706, the telecommunication device reduces a video call user interface display size to accommodate concurrent display of the video call user interface and a telecommunication device activity user interface. The magnitude of the reduction in the display size of the video call user interface may be based on a type of the telecommunication device activity.

At 708, the telecommunication device concurrently displays the video call user interface and the telecommunication device activity user interface. The concurrent display may include displaying the telecommunication device activity user interface adjacent to the reduced-display-size video call user interface or displaying the reduced-display-size video call user interface as an overlay to a portion of the telecommunication device activity user interface.

At 710, the telecommunication device receives user input related to the telecommunication device activity while a user of the telecommunication device engages in the video call.

At 712, the telecommunication device enables the user of the telecommunication device to resize either or both of the concurrently displayed user interfaces. At least one of the telecommunication device activity user interface or the video call user interface may have a minimum display size below which that user interface cannot be reduced or resized.

At 714, the telecommunication device notifies the video call service of the reducing of the display size.

At 716, in response to the notifying, the telecommunication device receives video call data at a reduced frame rate or reduced quality of service.

Figure 8:
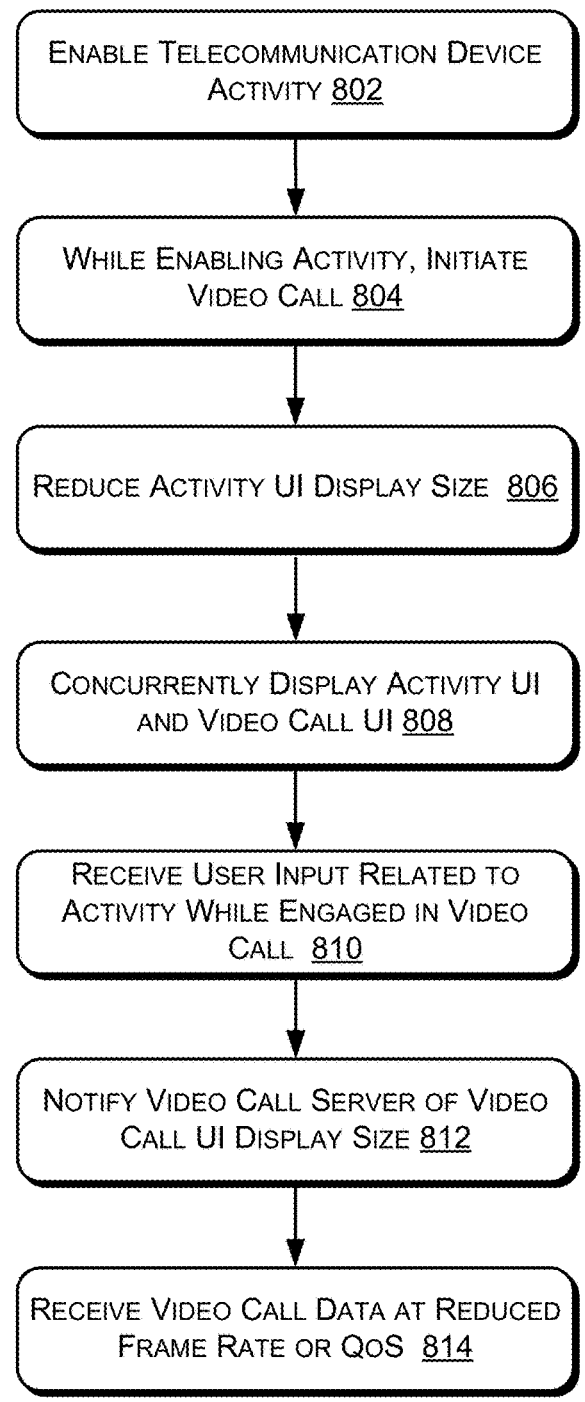
FIG. 8 illustrates an example process for initiating a video call while enabling an activity, concurrently displaying user interfaces for the video call and the activity, and receiving user input for the activity during the video call.

FIG. 8 illustrates an example process for initiating a video call while enabling an activity, concurrently displaying user interfaces for the video call and the activity, and receiving user input for the activity during the video call. The process includes, at 802, enabling a telecommunication device activity that is different from a video call, and possibly unrelated to a video call.

At 804, while enabling the telecommunication device activity, the telecommunication device initiates a video call. The initiating may be responsive to receiving an incoming voice call or responsive to user input.

At 806, the telecommunication device reduces a telecommunication device activity user interface display size to accommodate concurrent display of the telecommunication device activity user interface and of a video call user interface. The magnitude of the reduction in the display size of the telecommunication device activity user interface may be based on a type of the telecommunication device activity.

At 808, the telecommunication device concurrently displays the telecommunication device activity user interface and the video call user interface. The concurrent display may include displaying the telecommunication device activity user interface adjacent to the reduced-display-size video call user interface or displaying the reduced-display-size video call user interface as an overlay to a portion of the telecommunication device activity user interface.

At 810, the telecommunication device receives user input related to the telecommunication device activity while a user of the telecommunication device engages in the video call.

At 812, the telecommunication device notifies the video call service that the display size of the video call user interface is less than a display size of the full display screen of the telecommunication device.

At 814, in response to the notifying, the telecommunication device receives video call data at a reduced frame rate or reduced quality of service.

Figure 9:
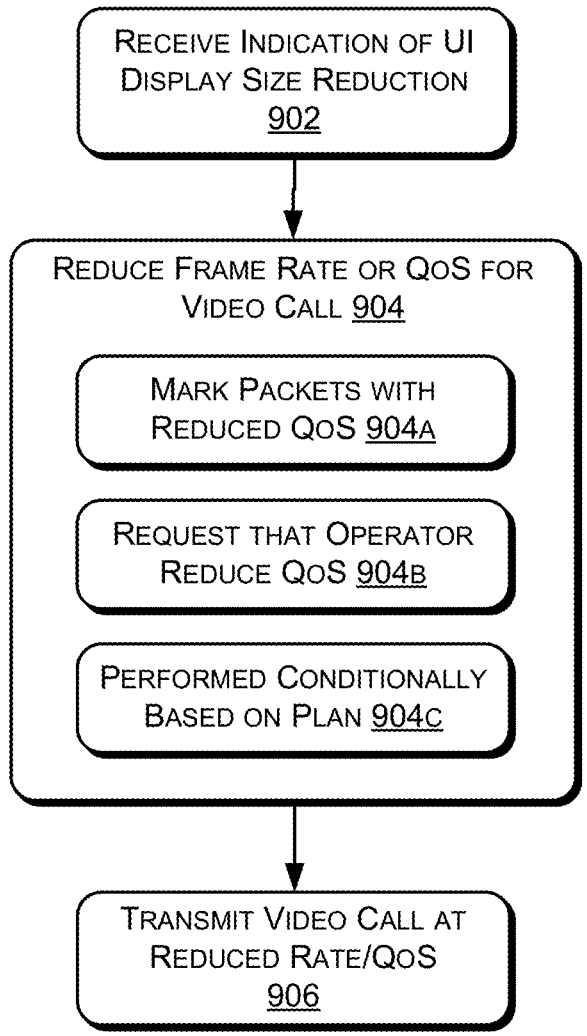
FIG. 9 illustrates an example process for receiving an indication that a user interface display size for a video call has been reduced, reducing a frame rate or QoS for the video call, and transmitting video call data at the reduced frame rate or QoS.

FIG. 9 illustrates an example process for receiving an indication that a user interface display size for a video call has been reduced, reducing a frame rate or QoS for the video call, and transmitting video call data at the reduced frame rate or QoS. The process includes, at 902, receiving, by a video call service, an indication that a display size of a video call interface rendered on a telecommunication device has been reduced. The indication may specify the reduced display size.

At 904, in response to receiving the indication, the video call service reduces a frame rate or quality of service associated with transmission of video call data to the telecommunication device. At 904a, the video call service effects the reduction by marking packets transmitting the video call data with the reduced quality of service. At 904b, the video call service effects the reduction by requesting that a network operator reduce the quality of service used in transmitting the video call data. At 904c, the reducing is performed conditionally based on a service plan or service agreement with a user of the telecommunication device.

At 906, the video call service transmits the video call data at the reduced frame rate or the reduced quality of service.

Figure 10:
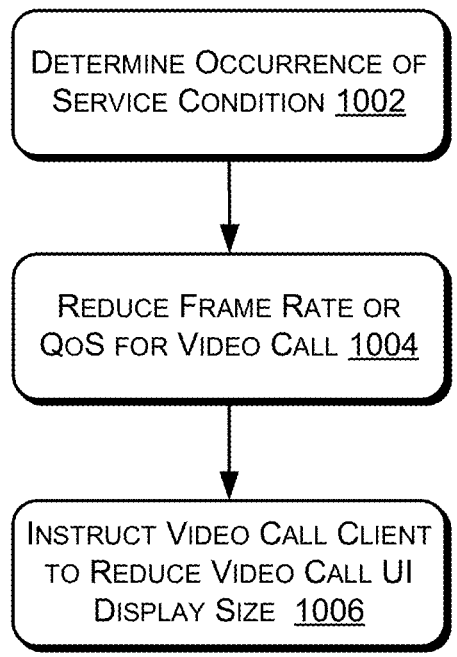
FIG. 10 illustrates an example process for reducing a frame rate or QoS for a video call and instructing a telecommunication device to reduce a user interface display size for the video call.

FIG. 10 illustrates an example process for reducing a frame rate or QoS for a video call and instructing a telecommunication device to reduce a user interface display size for the video call. The process includes, at 1002, determining the occurrence of a service condition, such as network congestion or impaired signal strength.

At 1004, in response to determining the occurrence of the service condition, a video call service reduces a frame rate or a quality of service associated with transmission of a video call to a video call client.

At 1006, the video call service instructs the video call client to reduce a display size of a video call interface responsive to the reduced frame rate or quality of service. The \instruction to reduce the display size of the video call interface may specify the reduced display size. Also, the instruction to reduce the display size of the video call interface may cause a telecommunication device associated with the video call client to suggest the reduction to a user of the telecommunication device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, by a telecommunication device, video call data associated with a video call, the video call data transmitted in first packets marked with a first quality of service indicating a first priority provided to the first packets;
    during the video call, receiving, by the telecommunication device, input initiating a telecommunication device activity that is different from, and unrelated to, the video call;
    responsive to the input, concurrently displaying, by the telecommunication device, an activity interface associated with the telecommunication device activity and a video call interface associated with the video call, the concurrently displaying including reducing a display size of the video call interface to accommodate the activity interface, wherein the concurrently displaying includes selecting, based on preferences or settings for the telecommunication device activity, a display arrangement among different display arrangements, the display arrangement displaying the activity interface adjacent to the reduced-display-size video call interface or displaying the reduced-display-size video call interface as an overlay to a portion of the activity interface;
    receiving, by the telecommunication device, user input related to the telecommunication device activity while a user of the telecommunication device engages in the video call;
    notifying, by the telecommunication device, a video call server of the reducing of the display size; and
    responsive to the notifying, receiving, by the telecommunication device, the video call data transmitted in second packets marked with a second, reduced quality of service in data transmission, the second, reduced quality of service indicating a second, reduced priority provided to the second packets that are transmitting the video call data.

2. The method of claim 1, wherein the telecommunication device activity includes at least one of electronic mail (email), texting, web browsing, gaming, media consumption, or a productivity tool.

3. The method of claim 1, wherein the input is user input or is a prompt from a telecommunication device application or from a remote service.

4. The method of claim 1, wherein the display size of the video call interface is reduced by a magnitude, the magnitude based on display size preferences or settings for the telecommunication device activity.

5. The method of claim 1, further comprising enabling the user to resize either or both of the activity interface and the reduced-display-size video call interface.

6. The method of claim 1, wherein at least one of the activity interface or the video call interface has a minimum display size.

7. One or more tangible non-transitory computer-readable media having stored thereon computer-readable instructions that, when executed by a telecommunication device, perform operations comprising:
    while enabling a user to engage in a telecommunication device activity, initiating a video call that is separate and distinct from the telecommunication device activity, wherein the telecommunication device activity is unrelated to the video call;
    concurrently displaying an activity interface associated with the telecommunication device activity and a video call interface associated with the video call, the concurrently displaying including either reducing a display size of the activity interface to accommodate the video call interface or overlaying the video call interface in front of a portion of the activity interface, wherein the concurrently displaying includes selecting, based on preferences or settings for the telecommunication device activity, a display arrangement among different display arrangements, the display arrangement displaying the video call interface adjacent to the reduced-display-size activity interface or displaying a reduced-display-size video call interface as an overlay to the portion of the activity interface;
    receiving user input related to the telecommunication device activity while the user engages in the video call;
    notifying a video call server that the video call interface will have a display size that is less than a total display size of a display of the telecommunication device; and
    in response to the notifying, receiving video call data transmitted in packets marked with a reduced quality of service in data transmission, as compared to a quality of service used for transmitting the video call data when the video call interface is substantially a same size as the total display size, the reduced quality of service indicating a reduced priority provided to the packets that are transmitting the video call data.

8. The one or more non-transitory tangible computer-readable media of claim 7, wherein the initiating is responsive to receiving an incoming voice call or is responsive to user input.

9. The one or more tangible non-transitory computer-readable media of claim 7, wherein the display size of the activity interface is reduced by a magnitude, the magnitude based on display size preferences or settings for the telecommunication device activity.

10. A computer-implemented method comprising:
    receiving, by a video call service during a video call associated with a telecommunication device, an indication that a display size of a video call interface rendered on the telecommunication device has been reduced resulting in a reduced display size, the indication based on an instruction sent to the telecommunication device to concurrently display, in response to input to the telecommunication device initiating a telecommunication device activity that is different from, and unrelated to, the video call, an activity interface associated with the telecommunication device activity and the video call interface associated with the video call, wherein concurrently displaying the activity interface and the video call interface includes reducing the display size of the video call interface to accommodate the activity interface, and wherein the concurrently displaying includes selecting, based on preferences or settings for the telecommunication device activity, a display arrangement among different display arrangements, the display arrangement displaying the activity interface adjacent to the reduced-display-size video call interface or displaying the reduced-display-size video call interface as an overlay to a portion of the activity interface;

in response to the indication, reducing, by the video call service, a quality of service to a reduced quality of service associated with packets that are to transmit video call data to the telecommunication device; and causing, by the video call service, the packets carrying the video call data to be transmitted with a reduced priority associated with the reduced quality of service.

11. The method of claim 10, wherein the indication specifies the reduced display size.

12. The method of claim 10, wherein reducing the quality of service comprises marking the packets transmitting the video call data with the reduced quality of service or requesting that a network operator reduce the quality of service used in transmitting the video call data.

13. The method of claim 10, wherein reducing the quality of service is performed conditionally based on a service plan or service agreement with a user of the telecommunication device.

14. The method of claim 10, wherein the causing the packets carrying the video call data to be transmitted with the reduced priority further comprises marking a packet of the packets as being under the reduced quality of service for data transmission.

15. The method of claim 11, further comprising:
determining, by the video call service, the reduced display size based on the indication; and
using rules or a model that associates specific display sizes with specific quality of service values to reduce the quality of service to the reduced quality of service based on the reduced display size.

* * * * *